GEORGES HEPNER,
Inventor
by Stephen H. Frishauf
Atty

Jan. 19, 1971 G. HEPNER 3,556,661

ANALYSIS APPARATUS FOR SPECTROMETER SIGNALS WITH FOURIER TRANSFORM OUTPUT

Filed April 10, 1968 6 Sheets-Sheet 2

United States Patent Office 3,556,661

Patented Jan. 19, 1971

3,556,661
ANALYSIS APPARATUS FOR SPECTROMETER SIGNALS WITH FOURIER TRANSFORM OUTPUT

Georges Hepner, Neuilly-sur-Seine, France, assignor to Compagnie Francaise Thomson Houston-Hotchkiss Brandt, Paris, France, a corporation of France Filed Apr. 10, 1968, Ser. No. 720,013
Claims priority, application France, Apr. 26, 1967, 104,285
Int. Cl. G01b *9/02;* G01d *9/42*
U.S. Cl. 356—106 8 Claims

ABSTRACT OF THE DISCLOSURE

A light generating cell, such as a luminescent diode projects its light on a film, to be scanned thereacross. The amount of light emitted by the diode is controlled by the output of the spectrometer, so that the density of the film, where exposed by the light emitting diode, will vary; simultaneously, the scanning of the diode across the film is synchronized with the position of the spectrometer displacement and the speed of scan controlled to be a function of the duration of the signal being studied; in one form of the invention, the signal is sampled at predetermined intervals and a pulse of given intensity, but of variable time duration, applied to the diode, in accordance with the signal from the spectrometer, to eliminate distortion due to non-linearities in film and diode response.

The present invention relates to spectrometric apparatus, and more particularly to apparatus providing a read out in Fourier transforms of signals derived from spectrometers. The invention is particularly applicable to interference spectrometers for analysis of spectrums in the infrared range, and particularly between 50 to 500 cm.$^{-1}$. The present invention will be described in connection with such a signal to be analyzed which, by way of example, is an interferogram signal supplied by a Gollay detector applied to a Michelson interferometer. It is, of course, understood that the combination with such an interferometer is not considered to be a limitation of the utility of the present invention, which is equally applicable to analysis of the spectrum of a signal, or of a phenomena, regardless where derived and transduced into an electrical signal.

Spectrometers providing outputs for transformation into Fourier series, and illuminated from a source, supply interferograms which represent the Fourier transform, in cosine functions of the spectrum of the source. The reconstitution of the different values of the spectra is obtained by a calculation which, in general, is done on a digital computer. Such a method is complex and time consuming. In accordance with another solution, the signal is sampled for each elementary displacement of the mirror of the interferometer, and the signal is then resolved by means of an analog computer. To this end, the signal from the interferogram is recorded on a continuously running magnetic tape from which, by harmonic analysis, the spectrum can be obtained. This system provides a resolution of about 100 points.

In accordance with yet another known process, spectral analysis is carried out by recording the signals on a film utilizing a variable-density process. The film is thereafter illuminated by coherent light, and a spatial Fourier transform is obtained by means of optical lens systems.

The present invention follows, essentially, this latter optical principle. It is an object of the present invention to overcome distorting non-linearities caused by recording on the film. These non-linearities primarily arise due to the non-linear response of a transducer element illuminating the film, as well as variations in the transparency of the film itself, as a function of the illumination. As a result, parasitic or ghost spectra result, which, in accordance with present known techniques, are not completely eliminated or separated from the spectrum to be analyzed and recorded on the film surface.

In general, therefore, the present invention relates to a spectrometric apparatus in which, by Fourier transform and optical analog calculation, spectral analysis of any signal $f(t)$ can be carried out. This signal is derived in form of an electrical signal and applied to the input of the apparatus. Undesirable spectra, due to non-linearities, are removed from the spectrum desired to be analyzed.

SUBJECT MATTER OF THE PRESENT INVENTION

Briefly, the spectrometric apparatus includes a transducer which, in preferred form, is a luminescent diode supplied by a constant current, and having a pulse exposure time proportional to the intensity of the interferogram signal to be analyzed. The light from the diode is focused to be recorded on a film, in form of variable density. The diode, and associated optical elements such as lenses and objectives, are mounted on a platform subject to displacement. The displacement itself is controlled for each variation $h$ of amplitude in the path difference $\Delta$ of an interferometer. The exposure time, that is the flash time of the diode, is controlled to follow the relationship $$\tau=\tau_0\pm kI(\Delta) \qquad (1)$$

for each step or change $h$ (amplitude) of $\Delta$ (sweep distance. $\tau_0$ and $k$ are constants; $I(\Delta)$ is the intensity of the signal output of the interferometer; and signs + and − are alternately applied at each step.

An optical device for restitution of the spectrum by Fourier transform is provided by illuminating with coherent light, in order to record the spectral analysis of the signal $I(\Delta)$ from the recorded film.

In accordance with a feature of the invention, the amplitude $h$ is chosen to be less, or at the most equal to ⅙ $V_M$, wherein $V_M$ is the maximum frequency in cm.$^{-1}$, or the number of maximum wavelength of the spectrum of the signal to be analyzed.

The structure, organization, and operation of the invention will now be described more specifically with reference to the accompanying drawings, wherein.

Figure 1:
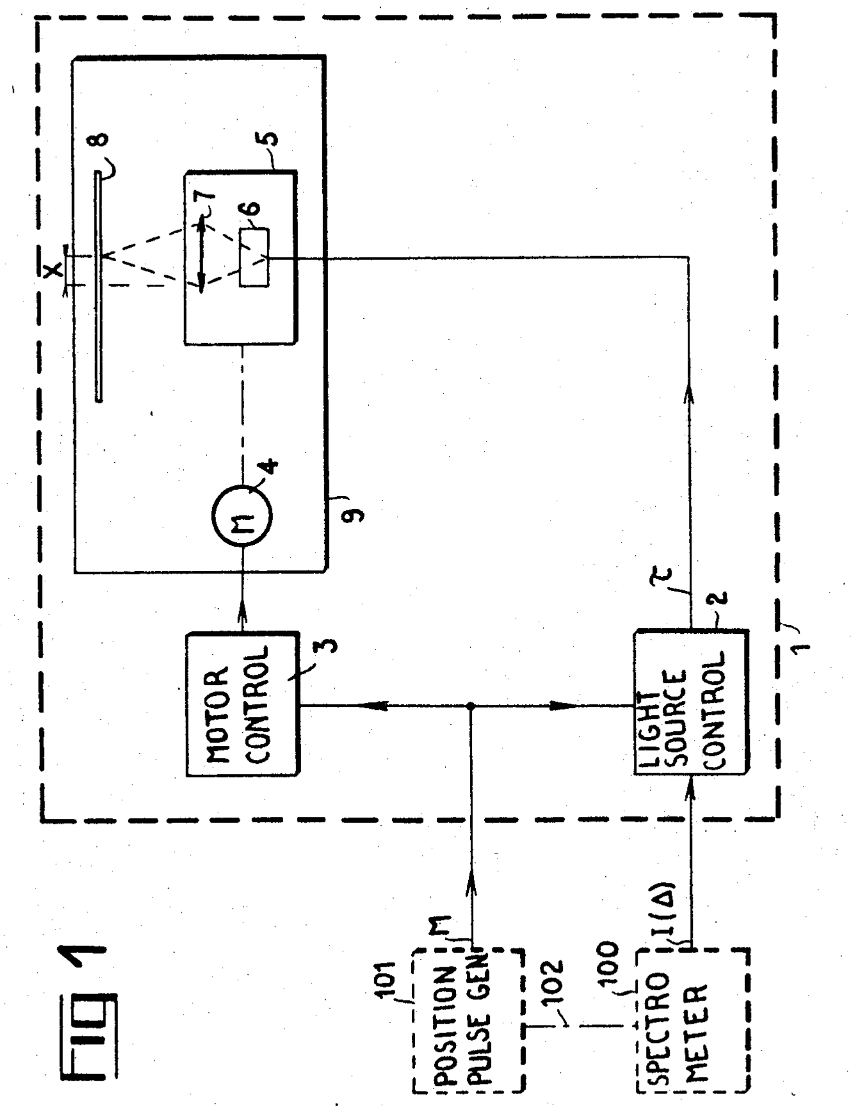
FIG. 1 is a schematic block diagram of the film recording device in accordance with the present invention.

Let it be assumed that a source of infra-red radiation having a spectrum $G(V)$ is to be analyzed, with $V$ being expressed in cm.$^{-1}$. In accordance with spectrometric techniques to provide Fourier transformation, an essentially plane wave, illuminating the interferometer, is derived from the source emitting the radiation. The interferometer may, for example, be a Michelson interferometer, having an optical path difference Δ, and a detector such as a Golay detector, which provides an intensity signal I(Δ) of the following value:

$$I(\Delta)=\int_0^\infty G(V)\cos^2 \pi\Delta V dV \quad (2)$$

by varying Δ within a range of ±Δ maximum, centered about Δ=0, an interferogram I(Δ) corresponding to the Fourier transform of the spectrum G(V) is obtained, if Δmax, has been chosen sufficiently great.

In order to determine the spectrum of the source, a new Fourier transformation of the interferogram I(Δ) must be done to reconstitute G(V) in symmetry with the negative frequencies, and then again for radiation at center, or zero frequency. This restitution from the film, having recorded thereon a representation of I(Δ) on the surface is done by optical means. A lens providing convergence, carries in its focal plane a transparent carrier to support the interferogram I(Δ) and illuminated by a single-frequency wave of coherent light, for example obtained from a laser. The spectrum G(V) then will appear as an image in the focal plane and may be recorded for further analysis.

Recording on the film is carried out by passing the film in front of a luminescent source modulated by the signal, the spectrum of which is to be determined. In case when the signals are interferograms, such as signals derived and in the form of I(Δ), this solution introduces difficulties due to non-linearities in the recording channel. In accordance with the present invention, non-linearities and the results thereof can be eliminated and thus spectral analysis of signals in the form of I($t$), in which $t$ represents a time-variable, may be recorded.

In a particular aspect of the present invention, directed to the recording of interference spectroscopic signals for transformation by Fourier analysis, the interferogram signal I(Δ) varies as a function of Δ; Δ, in this case, represents differences in optical path and controlled at will in the interferometer itself.

In accordance with an aspect of the invention, the recording on the film is non-continuous, that is rather in step-by-step. A circuit provides position pulses representative of the change in optical path Δ of the interferometer, and corresponding also to the positioning of the grating or moiré pattern in the interferometer.

The position signals are likewise utilized in order to apply the output signal I(Δ) of the interferometer on a carrier. Using sampling steps below a predetermined limit, ghost spectra and parasitic and noise signals, due to non-linearities in the recording are rejected as beyond the sought-after and desired spectrum G(V). Restitution of the G(V) spectrum can then be carried out in accordance with the well-known method, previously referred to.

A simplified block diagram of an apparatus of the present invention is illustrated in FIG. 1. Recording apparatus 1, itself receives an interference signal I(Δ) from a spectrometer 100, the output of which is to be analyzed by Fourier analysis. Circuit 101 provides position pulse signals M. Spectrometer 100, and the position pulse generator 101 by themselves are well known and need not be described further. Line 102 symbolizes a mechanical linkage between the interferometer mirror and the grating or moiré pattern or interference grate. The recording assembly 1 includes a light source control circuit 2, for control of a luminescent diode 6. Circuit 3 is a control circuit for a stepping motor 4. Light from luminescent diode 6 is focused by means of an optical objective on a photographic plate or film 8, causing a fine rectilinear trace to be scanned thereover, perpendicular to the displacement of the film or plate 8. The optical system 7, schematically indicated only, and luminescent diode 6 are conjointaly mounted on a movable platform 5, moved by motor 4 as schematically indicated by the chain-dotted lines. The assembly of the film 8, optical system 7 and diode 6 together with motor 4 is mounted in a light-tight black chamber, schematically indicated by box 9, in order to isolate the light-senstive elements from ambient light.

OPERATION

Figure 2:
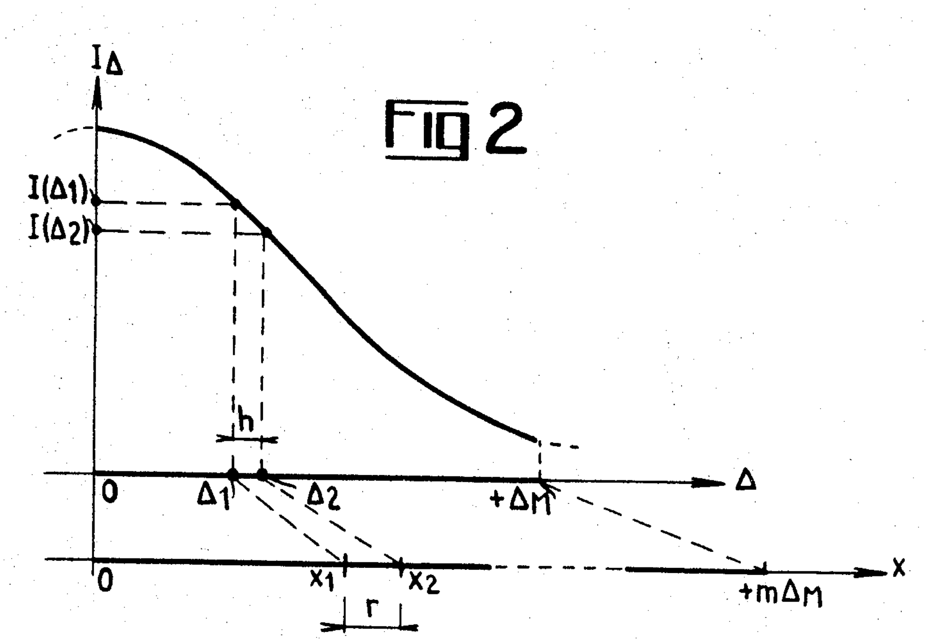
FIG. 2 is a graph illustrating an interferometer signal (interferogram) $I(\Delta)$ as a function of the difference in optical path, or optical progression $\Delta$ of an interferometer.

FIG. 2 illustrates an interferogram, in which I(Δ) is recorded on the ordinate, and Δ on the abscissa, representing the position of the movable mirror of the interferometer. Δ may vary from zero to a position of $+\Delta_M$. The curve I(Δ) is symmetrical upon variation from zero to $-\Delta_M$. The curve is sampled by means of a timed sampling device, and position pulses M are derived, synchronized with pulses at each variation $h$ during the change in optical path Δ, and representative of amplitude. Thus, if $\Delta=\Delta_1$, a pulse M is obtained at time $t_1$ and a second pulse will occur when Δ has, for example, reached a position of value $\Delta_2=\Delta_1+h$, at a new time $t_2$, and at a new position. If $m$ represents a reduction ratio between step-by-step displacement $r$ of the platform 5, for each pulse M and the displacement of the mirror, then the relationship $r=mh$ is obtained. If $x$ represents the position of the platform, and $x=0$ for $\Delta=0$, and the relationship $x=m\Delta$ obtains, then $x$ will vary with a range of $2m\Delta_M$, which will also be the length of the sensitized surface on film 8 which will be exposed. The control and supply circuit for the diode is re-set for each pulse M, for example with a time delay. The interferogram signal of intensity I(Δ) or I($x/m$) will then correspond to a position Δ of the mirror at a given moment and will provide a supply signal for the diode 6 of constant amplitude, but of a time duration $\tau$, in accordance with the relationship $$\tau=\tau_0\pm kI(x/m) \quad (3)$$

wherein $\tau_0$ and $k$ are constants. These pulses, of variable duration, corresponding to successive values of output signals I(Δ) will be alternatively applied with positive or negative signs and time shifted by a predetermined amount T, after arrival of the corresponding position pulses M. This time delay, or time shift T is chosen to be larger than a certain minimum value, in such a manner that the motion of the platform, 5, over the distance $r$, is terminated, as best seen in FIG. 3.

Figures 3A, 3B, 3C:
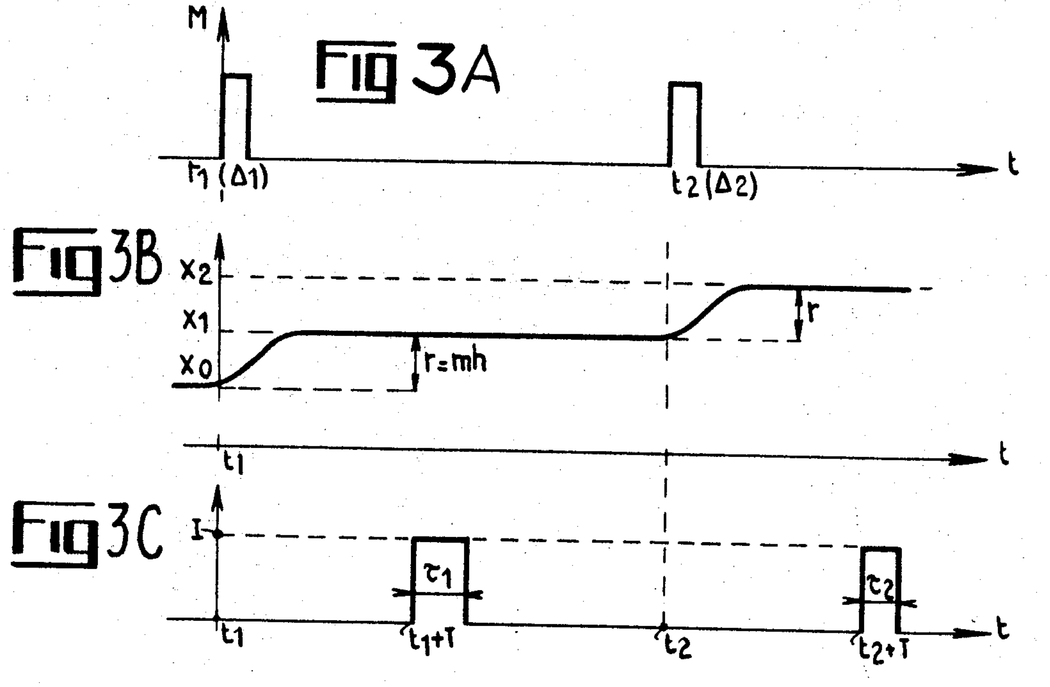
FIGS. 3, 4 and 5 are schematic representations of wave forms useful in the understanding of the principle of the present invention regarding the film recording, and the effect of nonlinearities.

FIG. 3 illustrates the relationship of pulses and displacements of the time scale. Line A indicates the position pulses, starting at predetermined times $t_1$,$t_2$ and terminating after predetermined intervals, and corresponding to positions indicated parenthetically ($\Delta_1$,$\Delta_2$). Graph B indicates movement of the platform 5, the distance being indicated on the ordinate; and graph C indicates the current supply to the luminscent diode 6, the duration of the pulses $\tau$ varying, but the total current being constant; as seen in graph C, the pulses, due to the time shift or time delay T will occur at a time when the platform 5 is at rest (horizontal line of graph B).

In the absence of a signal from the spectrometer I(Δ), a regular time-scale exposure pulse is applied to the luminescent diode, having a constant exposure time $\tau_0$. The shift, in time, to provide for displacement of the platform by $r$ will follow a certain distribution relationship $f_0(x)$, the diode will thus be triggered for periods $\tau=\tau_0$ for each change Δ, the amount of change being equal to the amount $h$.

Figure 4:
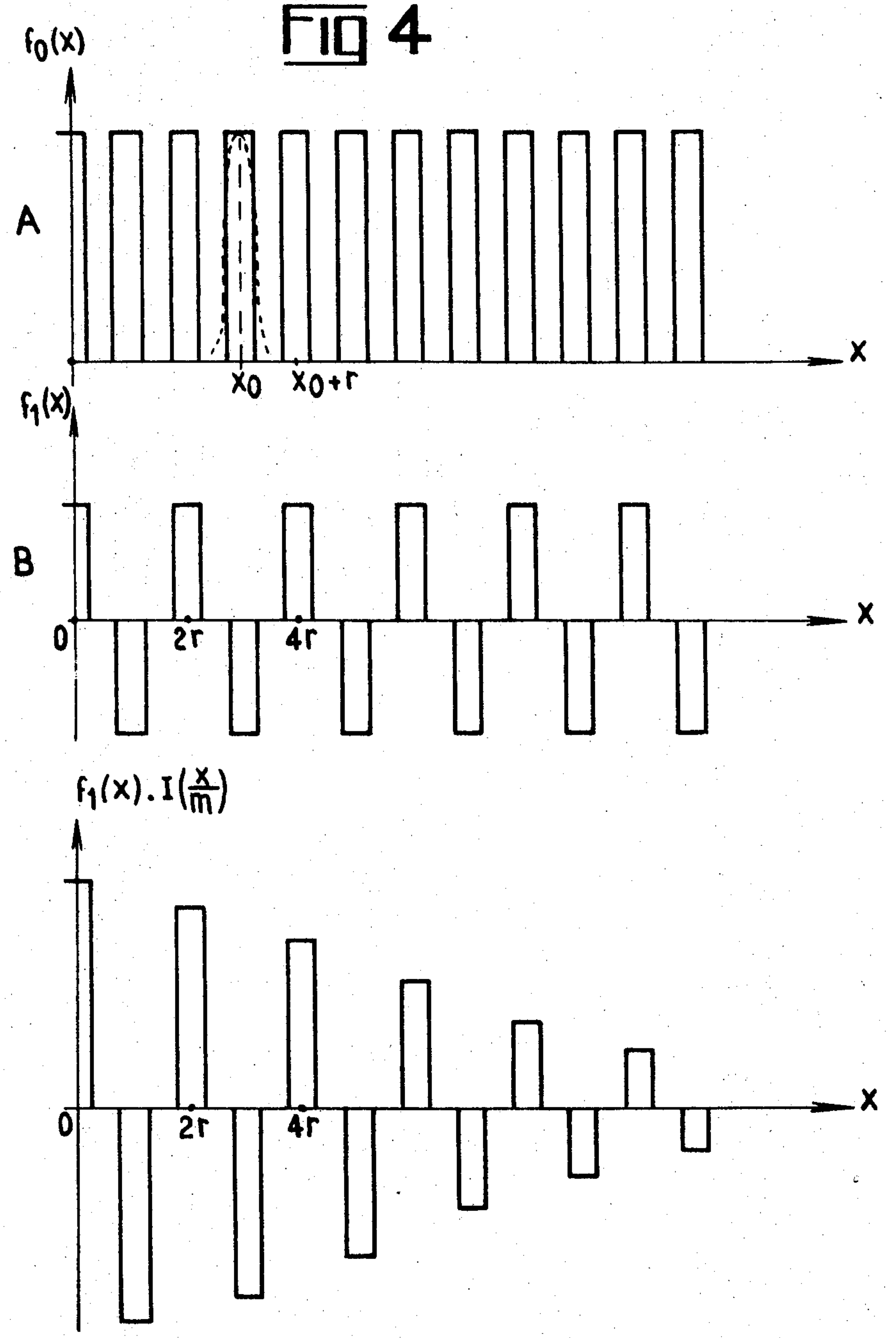

The relationship of $f_0(x)$ is represented in FIG. 4, and particularly in graph A, in a simplified pulse diagram. Variation in $f_0(x)$ depends on the illumination response of the diode, and the light path, including the lenses. Under normal conditions, the response and actual light output is indicated for position $x=x_0$ in dashed lines. The function $f_0(x)$ is recurrent at the rate $r$ along the film along the axis of displacement. When a signal I(Δ) or I($x/m$) is present, the signal is sampled by a function $f_1(x)$ corresponding to a coefficient $k$, including its sign, in the expression of $\tau$. This function $f_1(x)$ is symbolized in the same manner as $f_0(x)$ in FIG. 4B. It is a function of a recurrence rate $2r$, due to the change of sign at each displacement of $r$. Line C of FIG. 4 illustrates the application of the envelope of FIG. 1 of the signal I$(x/m)$ and represents the product of $f_1(x)$. I$(x/m)$. The relationship of the distribution of illumination is then finally given by the formula $$f(x)=f_0(x)+f_1(x)\cdot I(x/m) \qquad (4)$$

The transparency of the film varies as a function of the intensity of illumination in accordance with a predetermined relationship which, unfortunately, is non-linear. In one form, the relationship of transparency, after chemical treatment may be expressed mathematically as follows:

$$t(x)=t_0+Af(x)+Bf^2(x) \qquad (5)$$

The relationship (5) above continues, only the second orders having been shown. Upon reconstitution of the spectrum for analysis, Fourier transform of F$(u)$ of $t(x)$ is obtained, mathematically as follows:

$$t(x)\rightarrow F(u)=t_0\sigma(u)+AK(u)+B[K(u)*K(u)] \qquad (6)$$

The expression $t_0\cdot\sigma(u)$ is a continuous composite progression; K$(u)$ is the transform of $f(x)$, A and B are constant coefficients and * is the symbol for convolution. It can be shown mathematically that the following will obtain:

$$K(u)=K_0(u)+[K_1(u)*g(u/m)] \qquad (7)$$

wherein $K_0(u)$ and $K_1(u)$ are respectively the Fourier transforms of $f_0(x)$ and $f_1(x)$ and $g(u/m)$, and thus the transformation of I$(x/m)$ is that of the spectrum G(V) which is desired.

Figure 5:
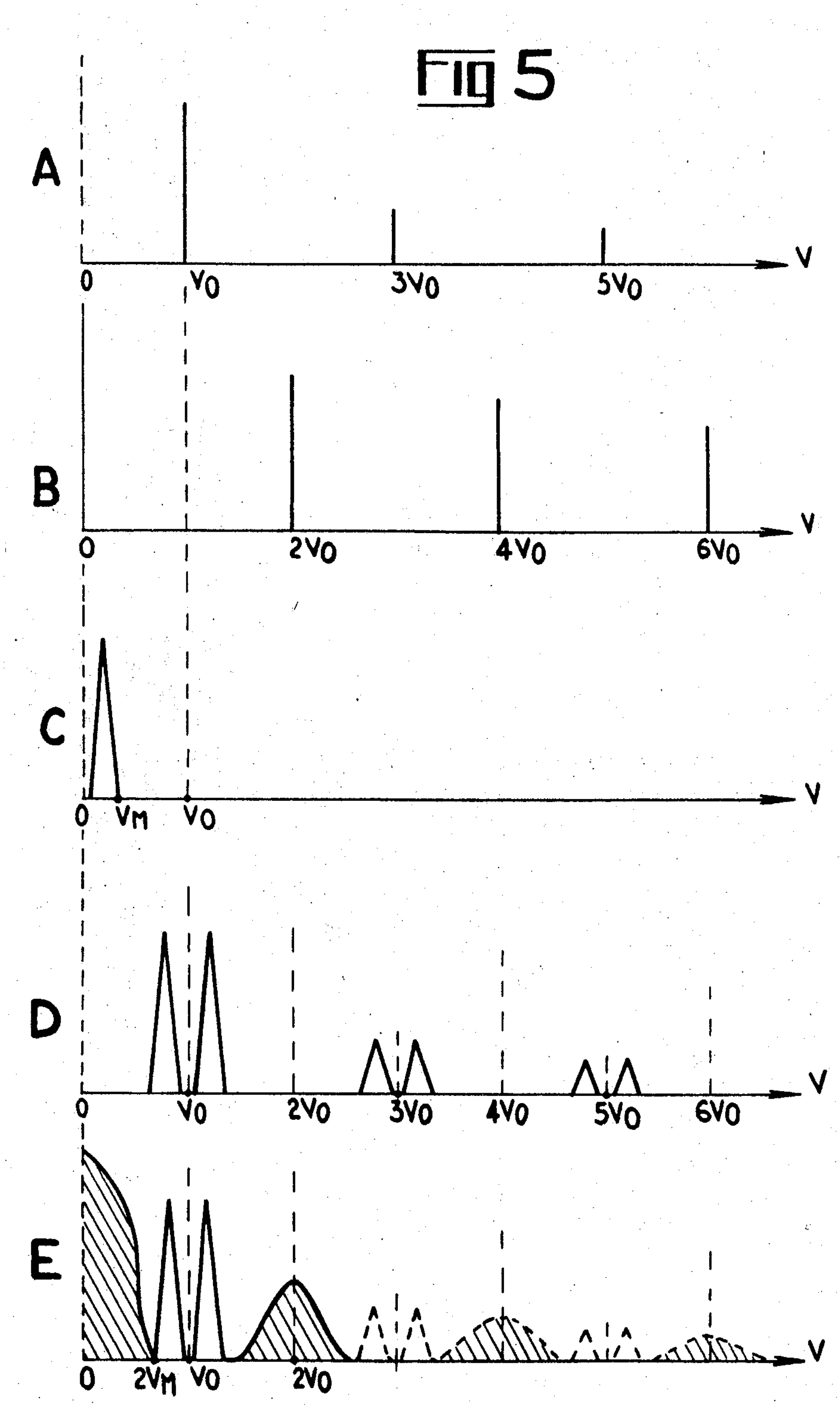

Non-linearities may arise during recording. Removal of the effects of such non-linearities will be explained in connection with FIG. 5. According to graph 5A, the wave form of the spectrum of the function $K_1(u)$ being the Fourier transform of $f_1(x)$ and having a period of $2r$, in simplified form, is a spectrum of lines of a frequency $v_0$, $3v_0$ . . . $\pm(2m+1)v_0$. This relationship takes into consideration symmetry with respect to the center frequency 0. FIG. 5B represents in the same fashion, the corresponding spectrum for the function $K_0(u)$ transformed by $f_0(x)$ of a period $r$. It again has a center frequency 0 and frequencies of $2V_0$, $4V_0$, . . . $\pm 2nV_0$. The spectrum looked for, G(V) is seen, alone, in line C of FIG. 5, the maximum frequency being indicated by $V_M$. By placing the signal I(Δ) on a carrier, the spectrum G(V) will be distributed in part by lines $\pm(2n+1)V_0$ of the spectrum $K_1(u)$ as seen at line D of FIG. 5. In the course of reconstitution, auto-convolution of the spectrum G(V) and I(Δ) on the carrier will result, and the distribution of line E of FIG. 5 will result. The shaded areas here represent parasitic spectra, due to non-linearities in the transducer system from electrical signal to recording on the film. These non-linearities, or parasitic spectra; mathematically; arise due to the term $B[K(u)*K(u)]$, as the transform of $Bf^2(x)$. The parasitic spectra are centered about frequencies $\pm 2nV_0$, and, in part, may have an amplitude of $2V_M$ in some of the frequencies. Consequently, in order to avoid the effects of these spectra, it is only necessary that $V_0$ should be greater, or equal to $3V_M$, that is that the change $h$ shall be chosen less, or at the most equal to ⅙ $V_M$.

Figure 6:
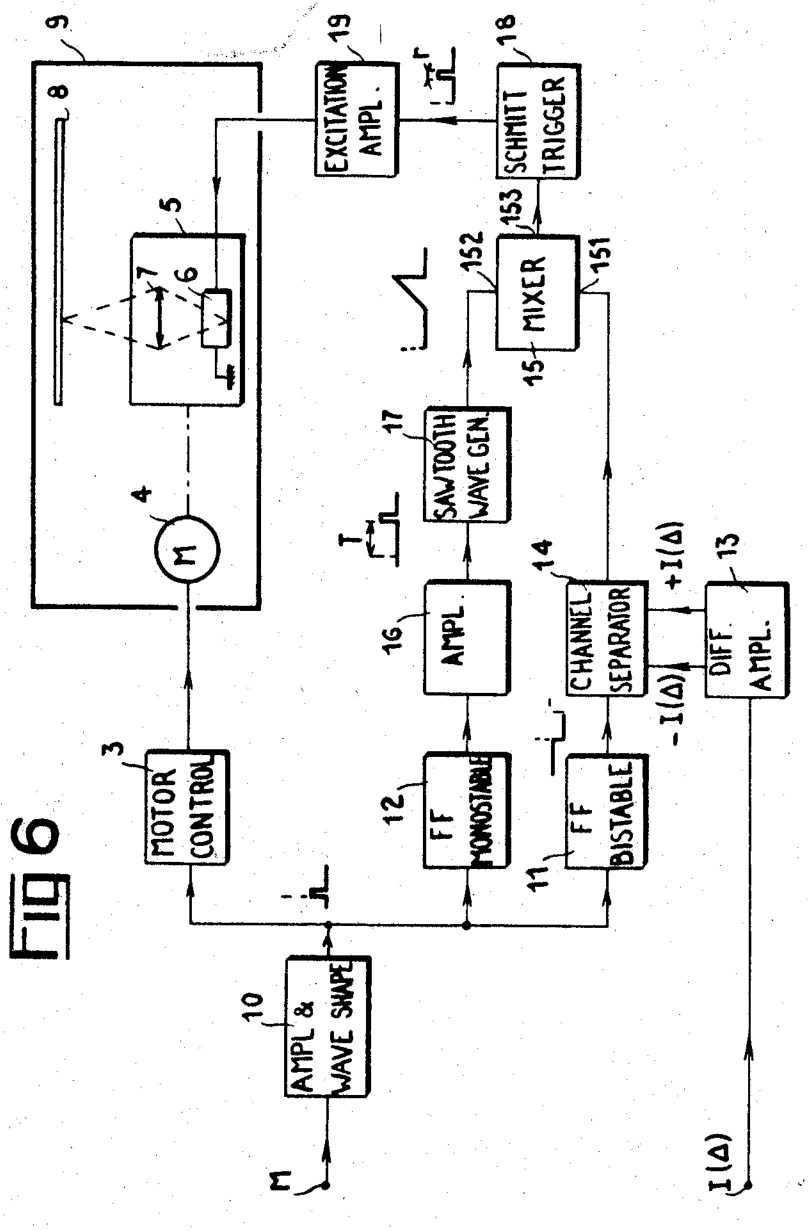
FIG. 6 is a schematic circuit diagram, in block form, of the recording apparatus in accordance with the present invention.

FIG. 6 illustrates, by way of example, in block diagram form the electronic circuits for recording these spectra in accordance with the present invention. The M signal, corresponding to pulses derived from the moiré pattern, or the grating, are applied to an amplifier and wave shaping circuit 10. The output signal triggers a circuit 3, functioning as a motor control, as well as a bistable flip-flop 11 and a monostable flip-flop 12, functioning as a delay circuit. The interference signal I(Δ) is applied to a double polarity output amplifier 13, supplying a pair of output signals —I(Δ) and +I(Δ). These signals are alternately sampled, in synchronism with the pulses M, by means of a channel separator circuit 14, triggered by the bistable flip-flop 11. A pair of successive (that is one positive and one negative) I(Δ) signals are applied to a first input 151 of a mixer 15.

Figure 7:
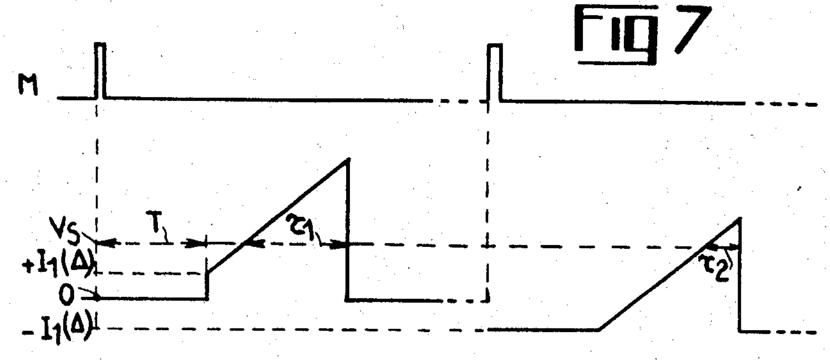
FIG. 7 illustrates wave forms, in schematic form, arising in the circuit of FIG. 6, and showing the variation of flash time $\tau$ as a function of $\pm I(\Delta)$.

Monostable flip-flop 12 functions as a delay circuit. The signal pulse M is delayed by a time period determined by the succession rate of the pulses M and the corresponding movement of the mirror in the interferometer. The output pulse from flip-flop 12 is amplified in a monostable amplifier circuit 16, in order to trigger a saw tooth generator 17, the output of which is applied to a second input 152 of mixer 15. The output potential from mixer 15, appearing at line 153, is applied to a threshold trigger 18, which may be in form of a Schmitt trigger, which in turn applies an unblocking pulse to an excitation amplifier 19, of duration $\tau$, to excite the lamp or diode 6 to emit a pulse of this time duration $\tau$. FIG. 7 illustrates, in simplified form, the pulse relationship, and its influence on the time $\tau$, for two successive pulses. For the first pulse, the saw tooth wave derived from generator 17 is increased by the value of the signal plus (+) I(Δ); for the next pulse, the output signal is decreased by the signal minus (—) I(Δ). The luminescent diode is, supplied with a constant current, but at a time duration by the signal $\tau$, and thus had light outputs of various time duration.

Film 8, as part of the transducer system, is preferably chosen to be of the type suitable for instantaneous development, for example having an emulsion SO243, with a resolution of 300 grains per millimeter.

Figure 8:
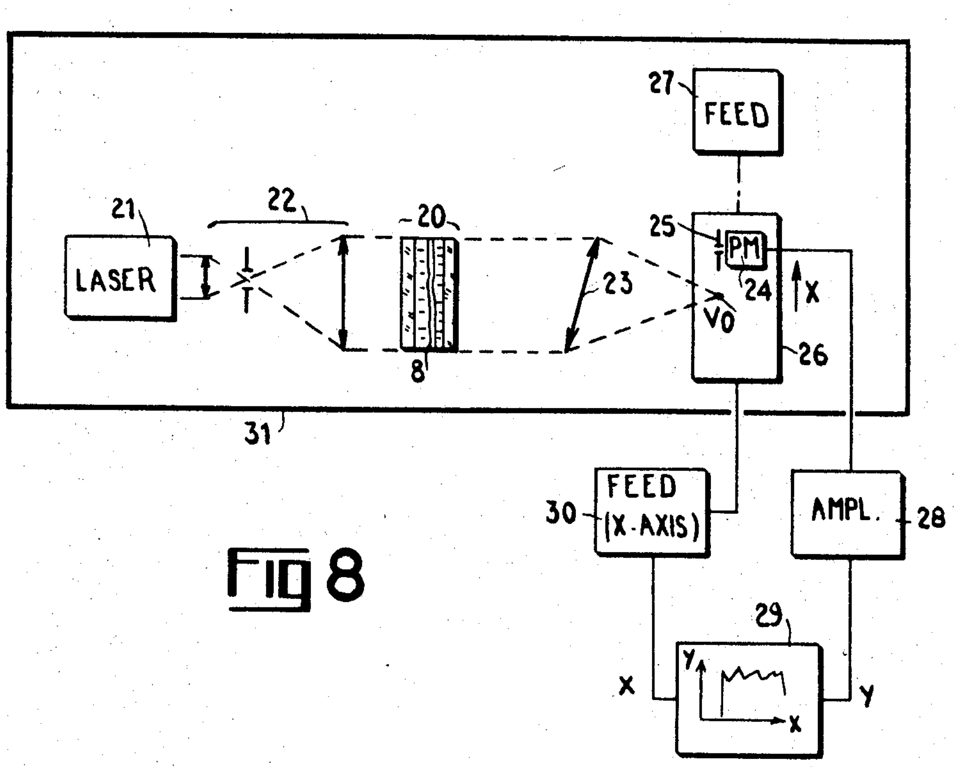
FIG. 8 is a schematic diagram, partly in block circuit form, of the read out and restitution device to reconstitute the spectrum for Fourier transform, from the recorded and exposed film.

Re-constitution of the spectrum after recording of the interferogram on film is done by means of known apparatus, one of which is, for example, illustrated in FIG. 8. The film is placed in an immersion vessel, illuminated by means of single frequency coherent light, for example derived from a laser 21. Vessel 20 provides a surrounding of constant refraction constant, the film 8 being contained within surfaces which are perfectly flat and parallel. Lens system 23 is inclined in order to obtain a Fourier analysis diagram on the plane of the focal image. The inclination permits placing the looked-for spectrum, for example $V_0$, in the center of the field, for example of a photomultiplier tube 24, in front of which a small slit or shutter 25 is placed, and displaced as indicated by the arrow X, for example by being located on the platform 26. A feed device, feeding platform 26, of standard construction, is schematically indicated at 27, connected with platform 26. The signals from photomultiplier 24 are applied, after amplification in an amplifier 28, to an X–Y recorder 29, the X-signals being derived from a feed signal circuit 30, likewise connected to the platform 26. The light sensitive elements are all contained within a light tight housing, schematically indicated by box 31.

The spectrometer, including the optical analog computer for spectral analyses utilizing Fourier transforms permits, in particular, recording of interferograms of a spectrum in the infra-red range. The signal is placed on a carrier and sampled in order to avoid difficulties due to non-linearities upon recording.

The apparatus may be utilized in different ways than those described in detail, and for different applications. For example, spectral analysis of any signal $f$(T), and transduced into an electrical signal I$(t)$ may be obtained in which $t$ is a time-variable, varying during a time T corresponding to the duration of the entire signal. The speed of transport of the film 8 should be chosen with due regard to this time duration T, and the photographic response thereof, as well as the available light. The diode 6 may then be supplied by a signal $I_D$, mathematically, $$I_D=I_0+kI(t)\cos\omega t \qquad (8)$$

wherein $I_0$ is a base, or constant intensity in the absence of a signal I$(t)$ and corresponding to a chosen base point. Circuit 2 is then supplied with the output signal I$(t)$ in order to derive therefrom the signal $I_D$ and, thereupon, modulate the alternating carrier with the signal $I_D$. Other structural changes and modifications, as determined by the requirements of particular applications or uses may be made without departing from the inventive concept.

A detailed and more complete discussion of the field, to which the present invention relates, and in particular to Fourier analysis of interferometer signals can be found in the literature, for example:

H. Yoshiga in "Applied Optics" 7, 1966, page 1159,

J. Connes in the "Revue d'Optique" 40, 1961, page 45 and

L. J. Cutrona in Instr. Radio Engin. IT 6, 1960, page 386.

What is claimed is:

1. Analysis apparatus for analysis of electrical signals forming output signals of a spectrometer to obtain analog representation of the electrical signals for analysis by Fourier transformation, said apparatus comprising.

a light sensitive film (8);

an optical light generating cell (6) and light directing means (7), said cell and light directing means being mounted in a dark chamber to expose the film to the light from the cell;

means mounting (5) said cell and light directing means, and said film, for relative scanning movement across the film to cause a trace of light to pass transverse to the width of the film;

displacement control means (3, 4) connected to said mounting means and to said electrical signal and controlling scanning displacement in synchronism with said electrical signal;

and a control circuit for said cell (6) connected to said electrical signal and applying a signal I($x$) representative of said electrical signal to said cell, wherein $x$ is a variable between limits of $x_1$ and $x_2$.

2. Apparatus according to claim 1, wherein said electrical signal is the output of an interferometer, and the displacement controls means are connected to the interferometer and control the scanning displacement in synchronism with the change of path difference of the interferometer; and the control circuit for said cell has a signal representative of output of the interferometer applied thereto.

3. Apparatus according to claim 2, wherein the change of path difference of said interferompter varies step-by-step, said displacement control means effecting step-by-step displacement of said mounting means;

and time signal sampling means are connected to said control circuit for said cell to sample the signal representative of I($x$) in step with said step-by-step displacement.

4. Apparatus according to claim 2, including excitation circuit means (12, 18, 19) connected to said cell (6), said excitation circuit means providing a carrier signal (cos $\omega t$) where $\omega$ is the angular frequency of the carrier; said control circuit modulating said carrier signal by said signal representative of interferometer output [I($x$)].

5. Apparatus according to claim 1, wherein the electrical signal [I($x$)] is a time varying signal varying during a time T, and said control circuit includes a signal generating circuit (11, 13, 14, 15, 18, 19) having a signal transfer function to apply a signal to said cell (6) in the form of $$I_D = I_0 + KI(t) \cos \omega t$$

wherein: $t$ is time, $I_0$ a constant intensity in the absence of a signal $I(t)$ and corresponding to a chosen base point and K are constants, $\omega$ a carrier pulse rate;

and the displacement control means moves said mounting means at a speed determined as a function of the duration T of the signal to be analyzed [I($t$)].

6. Apparatus according to claim 2, wherein said electrical signal is an interferogram signal [I(Δ)], a pulse generator is provided providing M pulses representative of position of the reflecting element of the interferometer, the optical path difference of said interferometer being defined by a distance Δ;

a pair of successive pulses from said pulse generator being representative of a distance $h$ of said distance Δ;

said displacement control means controlling displacement of said mounting means, step by step in synchronism with said pulse signal M.

7. Apparatus according to claim 6, said control circuit for said cell providing pulses to said cell of a duration defined by $$\tau = \tau_0 \pm KI(\Delta)$$

wherein $\tau_0$ and K are constants, and the sign plus (+) and minus (−) represent alternative application of pulse M, in sign, for each variation $h$ of the displacement of the interferometer Δ, said pulses being applied to said cell being of constant amplitude.

8. Apparatus according to claim 7, the sampling step ($h$) being not greater than $\frac{1}{16}$ $V_M$, wherein $V_M$ is the maximum frequency, in cm.$^{-1}$, of the spectrum to be resolved.

References Cited

UNITED STATES PATENTS

| | | | |
|---|---|---|---|
| 2,951,736 | 9/1960 | Black | 346—108 |
| 3,455,636 | 7/1969 | Haswell | 356—89 |

RONALD L. WILBERT, Primary Examiner

V. P. McGRAW, Assistant Examiner

U.S. Cl. X.R.

346—108; 356—74

"National Bureau of Standards Technical News Bulletin," vol. 48, No. 3; March 1964, "Spectrometer for Laser Analysis," pp. 46 and 47.